(12) United States Patent
Tanaka (10) Patent No.: US 6,880,324 B2
(45) Date of Patent: Apr. 19, 2005

(54) 1-AXIS TYPE COMBINED CYCLE PLANT

(75) Inventor: Satoshi Tanaka, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 98 days.

(21) Appl. No.: 10/457,443

(22) Filed: Jun. 10, 2003

(65) Prior Publication Data

US 2004/0088966 A1 May 13, 2004

(30) Foreign Application Priority Data

Nov. 13, 2002 (JP) ........................................ 2002-329873

(51) Int. Cl.[7] .............................. F02C 6/00; F02G 1/00; F02G 3/00
(52) U.S. Cl. .................. 60/39.182; 60/39.281
(58) Field of Search ............................. 60/39.15, 791, 60/39.182, 39.281

(56) References Cited

U.S. PATENT DOCUMENTS

| | | | | |
|---|---|---|---|---|
| 4,442,665 A | * | 4/1984 | Fick et al. | 60/39.12 |
| 5,199,256 A | * | 4/1993 | Moore | 60/39.182 |
| 5,301,499 A | * | 4/1994 | Kure-Jensen et al. | 60/773 |
| 5,617,716 A | * | 4/1997 | Schreiber et al. | 60/775 |
| 5,628,183 A | * | 5/1997 | Rice | 60/39.182 |
| 6,141,956 A | * | 11/2000 | Iijima et al. | 60/39.182 |
| 6,167,692 B1 | * | 1/2001 | Anand et al. | 60/39.182 |
| 6,463,741 B1 | * | 10/2002 | Frutschi | 60/780 |
| 6,530,207 B1 | * | 3/2003 | Tobo et al. | 60/39.091 |
| 6,543,234 B1 | * | 4/2003 | Anand et al. | 60/772 |
| 6,679,046 B1 | * | 1/2004 | Tanaka et al. | 60/39.091 |
| 6,748,733 B1 | * | 6/2004 | Tamaro | 60/39.182 |
| 2001/0004830 A1 | * | 6/2001 | Wakana et al. | 60/39.182 |
| 2001/0042369 A1 | * | 11/2001 | Wakazono et al. | 60/39.182 |
| 2002/0043063 A1 | * | 4/2002 | Kataoka et al. | 60/39.182 |
| 2004/0003583 A1 | * | 1/2004 | Uematsu et al. | 60/39.182 |
| 2004/0011019 A1 | * | 1/2004 | Schottler et al. | 60/39.182 |
| 2004/0055272 A1 | * | 3/2004 | Tanaka | 60/39.182 |
| 2004/0055273 A1 | * | 3/2004 | Hirayama et al. | 60/39.281 |
| 2004/0159105 A1 | * | 8/2004 | Tanaka et al. | 60/773 |

FOREIGN PATENT DOCUMENTS

| | | |
|---|---|---|
| JP | 11-324726 | 11/1999 |
| JP | 11-332110 | 11/1999 |

* cited by examiner

Primary Examiner—Cheryl J. Tyler
Assistant Examiner—William H. Rodriguez
(74) Attorney, Agent, or Firm—Wenderoth, Lind & Ponack, L.L.P.

(57) ABSTRACT

A combined cycle plant includes a gas turbine fuel control valve which controls supply of first fuel; a duct burner fuel control valve which controls supply of second fuel; a generator; a gas turbine, a boiler and a steam turbine. The gas turbine drives the generator by burning the first fuel supplied through the gas turbine fuel control valve. The boiler has a duct burner, heats gas exhausted from the gas turbine by burning the second fuel supplied through the duct burner fuel control valve by the duct burner, and heats water with the heated exhausted gas to generate steam. The steam turbine is driven with the steam to drive the generator. The combined cycle plant is further comprised of a controller which controls the gas turbine fuel control valve and the duct burner fuel control valve. The controller controls an open degree of the gas turbine fuel control valve such that rapid increase of the supply of the first fuel is restrained when the supply of the second fuel to the duct burner is stopped.

20 Claims, 3 Drawing Sheets

1-AXIS TYPE COMBINED CYCLE PLANT

BACKGROUND OF THE INVENTION

1. Field of the Invention

The present invention relates to a 1-axis type combined cycle plant. Especially, the present invention relates to a 1-axis type combined cycle plant in which the output efficiency is improved.

2. Description of the Related Arts

As a high efficiency power generation system, a combined cycle plant is known. In the combined cycle plant, steam is generated by using hot exhausted gas discharged from a gas turbine, and a steam turbine is driven with the steam. A generator is driven by the gas turbine and the steam turbine. By using the thermal energy of the exhausted gas from the gas turbine, the combined cycle plant can achieve high efficiency. As a combined cycle plant, a 1-axis type combined cycle plant is known. In the 1-axis type combined cycle plant, a turbine axis of gas turbine, a turbine axis of steam turbine and a rotor of generator are coaxially connected and combined as a unit. Generally, a power plant includes a plurality of sets of the gas turbines, the steam turbines and the generators. The 1-axis type combined cycle plant has advantages that the efficiency on partial load is high and the starting time is short, resulting in superior operativity. An example of a method of controlling such a 1-axis type combined cycle plant is shown in Japanese Laid Open Patent Application (JP-A-Heisei 11-332110).

In order to increase the output of the combined cycle plant, a duct burner is sometimes used. The duct burner sprays fuel into the exhausted gas discharged from the gas turbine and burns the fuel to raise the temperature of the exhausted gas. The rising of the temperature leads the increase of steam and thereby the increase of the output of the steam turbine. As a result, the output of the combined cycle increases.

In the 1-axis type combined cycle plant, the use of a duct burner has great influence on the combustor of the gas turbine. In the case of 1-axis type combined cycle plant, the output of the steam turbine varies in response to a flow rate of fuel supplied to the duct burner and therefore the output of the generator varies. As the gas turbine is controlled in response to the output of the connected generator, the flow rate of the fuel supplied to the duct burner influences on the gas turbine directly. Especially, rapid decrease of the flow rate of the fuel supplied to the duct burner affects crucial influence on the gas turbine. If the flow rate of the fuel supplied to the duct burner decreases rapidly, the output of the generator decreases rapidly. In this case, the flow rate of the fuel supplied to the gas turbine increases rapidly to compensate the rapid decrease of the output of the generator. The rapid increase of the flow rate of the fuel supplied to the gas turbine often causes damage to the combustor of the gas turbine. When the duct burner is urgently stopped due to a defect while a lot of fuel is supplied to the duct burner, the influence on the gas turbine is more serious.

A 1-axis type combined cycle plant with a duct burner is demanded to have a function to protect the combustor from the damage caused due to rapid decrease of the flow rate of the fuel supplied to the duct burner.

In conjunction with the above description, a control apparatus of a power generation plant is disclosed in Japanese Laid Open Patent Application (JP-A-Heisei 11-324726). In this reference, a speed control load control signal is determined based on a power generation instruction value which is instructed based on change of a system frequency, measured values of generated power and axis speed, and a predetermined control rate. In the power generation plant with a turbine and a generator which are connected with each other via an axis, load control of the turbine is carried out based on the speed control load control signal to stabilize the system frequency. At this time, the load control of the turbine is carried out based on an operation instruction value which is determined by multiplying the speed control load control signal by a load limitation function to limit the change of the speed control load control signal.

SUMMARY OF THE INVENTION

Therefore, an object of the present invention is to provide a 1-axis type combined cycle plant which has a function to protect a combustor from damage caused due to rapid decrease of a flow rate of fuel supplied to a duct burner.

In an aspect of the present invention, a combined cycle plant includes a gas turbine fuel control valve which controls supply of first fuel; a duct burner fuel control valve which controls supply of second fuel; a generator; a gas turbine, a boiler and a steam turbine. The gas turbine drives the generator by burning the first fuel supplied through the gas turbine fuel control valve, and the boiler has a duct burner, heats gas exhausted from the gas turbine by burning the second fuel supplied through the duct burner fuel control valve by the duct burner, and heats water with the heated exhausted gas to generate steam. The steam turbine is driven with the steam to drive the generator. The combined cycle plant is further comprised of a controller which controls the gas turbine fuel control valve and the duct burner fuel control valve. The controller controls an open degree of the gas turbine fuel control valve such that rapid increase of the supply of the first fuel is restrained when the supply of the second fuel to the duct burner is stopped.

Here, the controller may include a gas turbine controller which controls the open degree of the gas turbine fuel control valve in response to power generated by the generator; and a duct burner controller which controls an open degree of the duct burner fuel control valve such that a flow rate of the second fuel supplied to the duct burner is coincident with a duct burner fuel flow rate instruction. In this case, the duct burner controller desirably controls the open degree of the duct burner fuel control valve such that a change rate of the open degree of the duct burner fuel control valve falls within a predetermined range. Also, the duct burner controller may include a fuel flow instruction generating unit which generates the duct burner fuel flow rate instruction as an instruction value of the flow rate of the second fuel supplied to the duct burner. The fuel flow instruction generating unit may include a change rate limitation unit which limits the change rate of the duct burner fuel flow rate instruction within the predetermined range.

Also, the gas turbine controller desirably controls the open degree of the gas turbine fuel control valve such that a permitted maximum increase rate of the open degree of the gas turbine fuel control valve for a first period containing a combustion period of the duct burner is smaller than the permitted maximum increase rate of the open degree of the gas turbine fuel control valve for a second period containing a non-combustion period of the duct burner. Instead, the gas turbine controller may control the open degree of the gas turbine fuel control valve such that a permitted maximum increase rate of the open degree of the gas turbine fuel control valve for a first period containing a combustion period of the duct burner and a predetermined period subsequent to the combustion period is smaller than the permitted maximum increase rate of the open degree of the gas turbine fuel control valve for a second period containing a non-combustion period of the duct burner.

Also, the gas turbine controller may include a rotation speed set point generating unit which generates a gas turbine rotation speed set point; a governor control unit which determines a governor control open degree instruction such that a rotation speed of the gas turbine is controlled to be coincident with the gas turbine rotation speed set point; and an output set point generating unit which generates a generator output set point. Further, the gas turbine controller may include a load limit control unit which determines a load limit control open degree instruction value such that an output of the generator is controlled to be coincident with the generator output set point; and a gas turbine fuel control valve open degree determining unit which determines an instruction value of the open degree of the gas turbine fuel control valve in response to the governor control open degree instruction and the load limit control open degree instruction. At this time, the rotation speed set point generating unit sets the gas turbine rotation speed set point to a first predetermined value when the supply of the second fuel to the duct burner is stopped due to an abnormal event. Also, the output set point generating unit sets the generator output set point to a second predetermined value when the supply of the second fuel to the duct burner is stopped due to the abnormal event. In this time, the rotation speed set point generating unit desirably sets the gas turbine rotation speed set point to the first predetermined value by gradually decreasing the gas turbine rotation speed set point to the first predetermined point when the supply of the second fuel to the duct burner is stopped due to the abnormal event. Also, the output set point generating unit may set the generator output set point to the second predetermined value by gradually decreasing the generator output set point to the second predetermined value when the supply of the second fuel to the duct burner is stopped due to the abnormal event.

Also, a turbine axis of the gas turbine, a turbine axis of the steam turbine and a rotor of the generator may be coaxially connected and rotate together.

In another aspect of the present invention, a 1-axis type combined cycle plant includes a gas turbine; a boiler which heats exhausted gas discharged from the gas turbine by a duct burner and heats water with the heated exhausted gas to generate steam; a steam turbine which is driven with the steam; and a generator. The combined cycle plant further includes a gas turbine fuel control valve which supplies fuel to the gas turbine; a duct burner fuel control valve which supplies fuel to the duct burner; a gas turbine controller which controls an open degree of the gas turbine fuel control valve in response to power generated by the generator; and a duct burner controller which controls an open degree of the duct burner fuel control valve. A turbine axis of the gas turbine, a turbine axis of the steam turbine and a rotor of the generator are coaxially connected and rotate together. The duct burner controller includes a duct burner fuel control valve open degree control unit which controls the open degree of the duct burner fuel control valve such that a decrease rate of the open degree of the duct burner fuel control valve falls within a predetermined range.

Here, the duct burner controller may include a fuel flow instruction generating unit which generates a fuel flow instruction as an instruction value of the flow rate of fuel supplied to the duct burner. The fuel flow instruction generating unit may include a change rate limitation unit which limits a change rate of the fuel flow instruction within the predetermined range. The duct burner fuel control valve open degree control unit may control the open degree of the duct burner fuel control valve such that the flow rate of fuel supplied to the duct burner is coincident with the fuel flow instruction.

Also, the gas turbine controller may control the open degree of the gas turbine fuel control valve such that a permitted maximum increase rate of the open degree of the gas turbine fuel control valve for a combustion period of the duct burner is smaller than the permitted maximum increase rate of the open degree of the gas turbine fuel control valve for a non-combustion period of the duct burner. Instead, the gas turbine controller may control the open degree of the gas turbine fuel control valve such that a permitted maximum increase rate of the open degree of the gas turbine fuel control valve for a combustion period of the duct burner and for a predetermined period subsequent to the combustion period is smaller than the permitted maximum increase rate of the open degree of the gas turbine fuel control valve for a period other than the combustion period and the predetermined period.

Also, the gas turbine controller may include a rotation speed set point generating unit which generates a gas turbine rotation speed set point; a governor control unit which determines a governor control open degree instruction such that rotation speed of the gas turbine is controlled to be coincident with the gas turbine rotation speed set point; and an output set point generating unit which generates a generator output set point. The gas turbine controller may further include a load limit control unit which determines a load limit control open degree instruction value such that an output of the generator is controlled to be coincident with the generator output set point; and a gas turbine fuel control valve open degree determining unit which determines an instruction value of the open degree of the gas turbine fuel control valve in response to the governor control open degree instruction and the load limit control open degree instruction. The rotation speed set point generating unit sets the gas turbine rotation speed set point to a first predetermined value when supply of fuel to the duct burner is stopped in an abnormal event. The output set point generating unit sets the generator output set point to a second predetermined value when the supply of fuel to the duct burner is stopped due to the abnormal event. In this case, the rotation speed set point generating unit may set the gas turbine rotation speed set point to the first predetermined value by gradually decreasing the gas turbine rotation speed set point to the first predetermined point when the fuel supply to the duct burner is stopped due to the abnormal event. Or, the output set point generating unit may set the generator output set point to the second predetermined value by gradually decreasing the generator output set point to the second predetermined value when the fuel supply to the duct burner is stopped due to the abnormal event.

In another aspect of the present invention, a 1-axis type combined cycle plant includes a gas turbine; a boiler which heats exhausted gas discharged from the gas turbine by a duct burner, and heats water with the heated exhausted gas and generates steam; a steam turbine which is driven by the steam; and a generator. The combined cycle plant further includes a gas turbine fuel control valve which supplies the gas turbine with fuel; a duct burner fuel control valve which supplies the duct burner with fuel; a gas turbine controller which controls an open degree of the gas turbine fuel control valve in response to an output of the generator; and a duct burner controller which controls an open degree of the duct burner fuel control valve. A turbine axis of the gas turbine, a turbine axis of the steam turbine and a rotor of the generator are coaxially connected and rotate together. The gas turbine controller controls the open degree of the gas turbine fuel control valve such that a permitted maximum increase rate of the open degree of the gas turbine fuel control valve for a combustion period of the duct burner is smaller than the permitted maximum increase rate of the open degree of the gas turbine fuel control valve for a non-combustion period of the duct burner.

In another aspect of the present invention, a 1-axis type combined cycle plant includes a gas turbine; a boiler which heats exhausted gas discharged from the gas turbine by a duct burner, and heats water with the heated exhausted gas and generates steam; a steam turbine which is driven by the steam; and a generator. The combined cycle plant further includes a gas turbine fuel control valve which supplies fuel to the gas turbine; a duct burner fuel control valve which supplies fuel to the duct burner; a gas turbine control system which controls an open degree of the gas turbine fuel control valve in response to the generator output; and a duct burner controller which controls the open degree of the duct burner fuel control valve. A turbine axis of the gas turbine, a turbine axis of the steam turbine and a rotor of the generator are coaxially connected and rotate together, and the gas turbine controller controls the open degree of the gas turbine fuel control valve such that a permitted maximum increase rate of the open degree of the gas turbine fuel control valve for a combustion period of the duct burner and for a predetermined period subsequent to the combustion period is smaller than the permitted maximum increase rate of the open degree of the gas turbine fuel control valve for a period other than the combustion period and the predetermined period.

DESCRIPTION OF THE PREFERRED EMBODIMENTS

Hereinafter, a 1-axis type gas turbine power plant of the present invention will be described with reference to the attached drawings.

Figure 1:
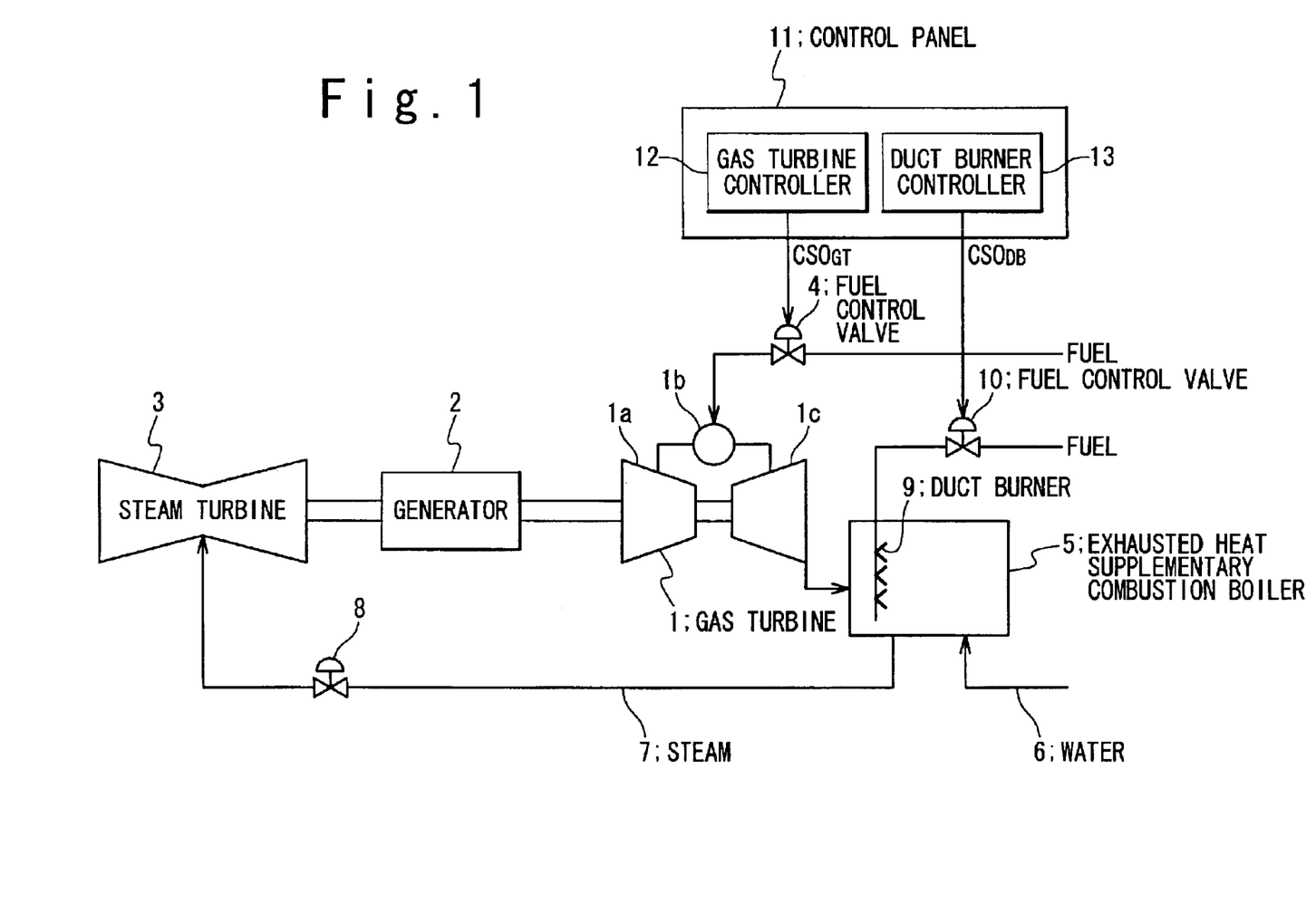
FIG. 1 shows a 1-axis type combined cycle plant according to an embodiment of the present invention.

Referring to FIG. 1, the 1-axis type gas turbine power plant according to an embodiment of the present invention is composed of a gas turbine 1, a generator 2 and a steam turbine 3. The turbine axis of the gas turbine 1, the rotor of the generator 2 and the turbine axis of the steam turbine 3 are coaxially coupled and rotate as one body. The generator 2 is driven by the gas turbine 1 and the steam turbine 3 to generate electric power.

The gas turbine 1 is composes of a compressor $1a$, a combustor $1b$ and a turbine $1c$. Compressed air is supplied from the compressor $1a$ to the combustor $1b$, and fuel is also supplied through a fuel control valve 4. The combustor $1b$ burns the supplied fuel using the compressed air to produce combustion gas, and supplies the combustion gas to the turbine $1c$. The turbine $1c$ takes out rotation force from the supplied combustion gas and drives the generator 2. The exhausted gas discharged from the turbine $1c$ is supplied to an exhausted gas supplementary combustion boiler 5. The exhausted gas supplementary combustion boiler 5 heats water 6 with the exhausted gas to generate steam 7. The steam 7 is supplied to the steam turbine 3 through a steam control valve 8. The steam turbine 3 takes out rotation force from the supplied steam to drive the generator 2.

To increase the output of the generator 2, a duct burner 9 is provided for the exhausted gas supplementary combustion boiler 5. Fuel is supplied to the duct burner 9 through a fuel supply valve 10. The duct burner 9 sprays the supplied fuel into the exhausted gas discharged from the turbine $1c$. As the fuel is sprayed into the exhausted gas, the fuel is burned and temperature of the exhausted gas rises. As the temperature of the exhausted gas rises, the amount of the generated steam 7 increases, resulting in the increase of the output of the steam turbine 3 which is driven by the steam 7 increases. Therefore, the output of the generator 2 is driven by the steam turbine 3.

The 1-axis type gas turbine power plant is further composed of a control panel 11 to control the gas turbine 1 and the duct burner 9. The control panel 11 is composed of a gas turbine controller 12 and a duct burner controller 13. The gas turbine controller 12 determines an open degree instruction CSO as an instruction value of a open degree of the fuel control valve 4, which controls an amount of fuel supplied to the gas turbine 1, in response to a rotation speed n of the gas turbine 1 and a generator output LD as the output of the generator 2. The open degree of the fuel control valve 4 is set to a value instructed by the open degree instruction CSO. The duct burner controller 13 determines an open degree instruction $CSO_{DB}$ as an instruction value of the open degree of the fuel control valve 10 which control an amount of fuel supplied to the duct burner 9. The open degree of the fuel control valve 10 is set to a value instructed by the open degree instruction $CSO_{DB}$.

Figure 2:
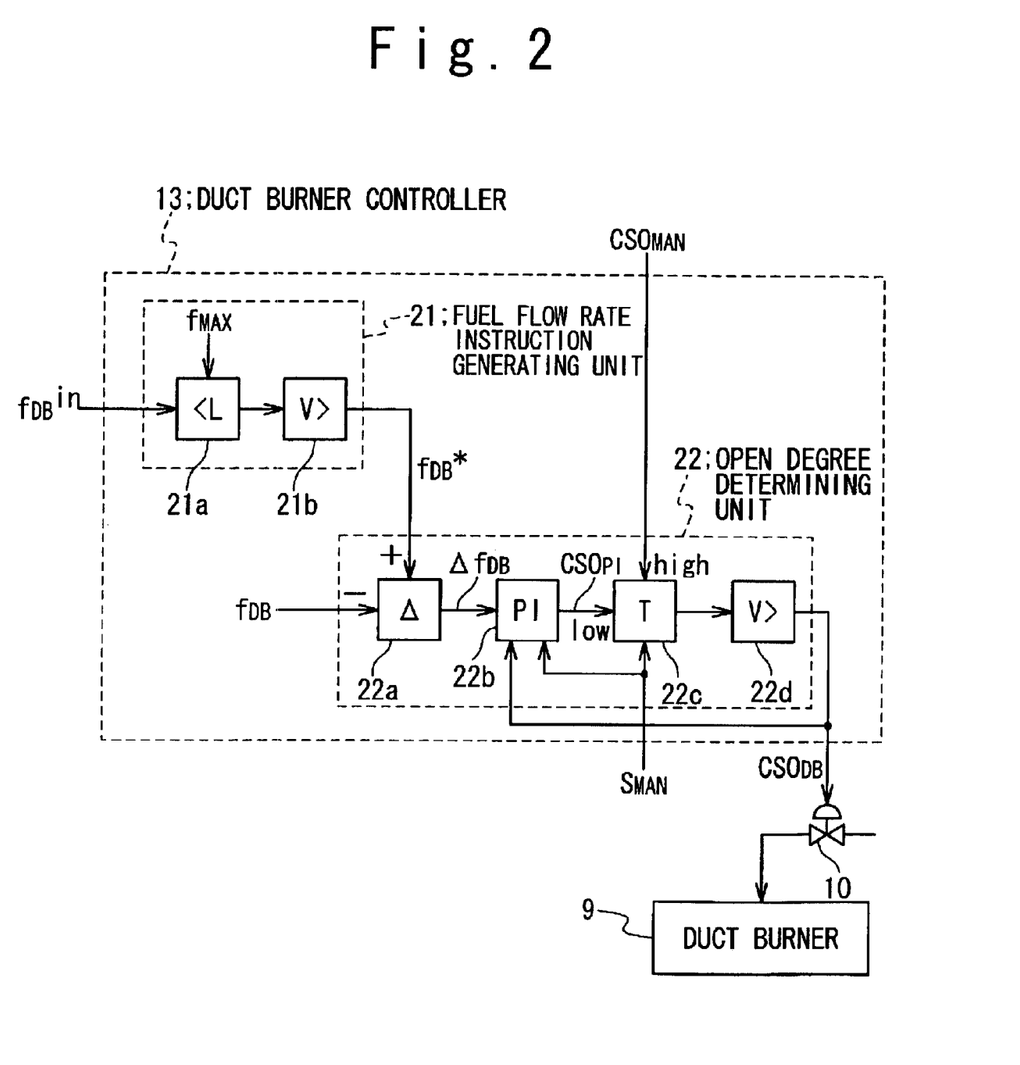
FIG. 2 is a function diagram showing an operation of a duct burner controller.

FIG. 2 is a function diagram showing an operation of the duct burner controller 13. The duct burner controller 13 is set to either of a manual mode or an automatic mode based on a manual setting signal $S_{MAN}$. The duct burner controller 13 operates in the manual mode when the manual setting signal $S_{MAN}$ is in "high" state and operates in the automatic mode when the manual setting signal $S_{MAN}$ is in "low" state.

In the manual mode, the duct burner controller 13 determines the open degree instruction $CSO_{DB}$ of the fuel control valve 10 in response to a manual open degree instruction $CSO_{MAN}$ inputted by an operator of the plant. In the automatic mode, the duct burner controller 13 determines a fuel flow rate instruction $f_{DB}*$ based on the duct burner fuel flow rate set value $f_{DB}{}^{in}$ inputted by the operator of the plant and generates the open degree instruction $CSO_{DB}$ to the fuel control valve 10 such that the flow rate of the fuel supplied to the duct burner 9 is the fuel flow rate instruction $f_{DB}*$.

In detail, the duct burner controller 13 is composed of a fuel flow rate instruction generating unit 21 and an open degree determining unit 22. The fuel flow rate instruction generating unit 21 generates the fuel flow rate instruction $f_{DB}*$ from the duct burner fuel flow rate set point $f_{DB}{}^{in}$ which is inputted by the operator of the plant. The fuel flow rate instruction $f_{DB}*$ is generated typically to coincide with the duct burner fuel flow rate set point $f_{DB}{}^{in}$ inputted by the operator of the plant. However, the fuel flow rate instruction $f_{DB}*$ is generated by the fuel flow rate instruction generating unit 21 such that it does not exceed the flow rate upper limit value $F_{MAX}$. If the fuel flow rate instruction $f_{DB}*$ is too large, too much fuel is supplied to the duct burner 9. As a result, the temperatures of the exhausted heat supplementary combustion boiler 5 and the duct burner 9 become so high that they are damaged. Therefore, the fuel flow rate instruction $f_{DB}^*$ is generated so as not to exceed the flow rate upper limit $f_{MAX}$, and the exhausted heat supplementary combustion boiler 5 and the duct burner 9 are protected.

Moreover, the fuel flow rate instruction $f_{DB}^*$ is generated for the change rate to be in a predetermined range. When the fuel flow rate instruction $f_{DB}^*$ changes rapidly, the flow rate of the fuel supplied to the duct burner 9 changes rapidly. Therefore, the generator output LD of the generator 2 changes rapidly. As mentioned before, the flow rate of the fuel supplied to the gas turbine 1 is controlled in response to the generator output LD, so rapid change of the generator output LD causes the rapid change of the flow rate of the fuel supplied to the gas turbine 1. The rapid change of the flow rate of the fuel supplied to the gas turbine 1 is not desirable because it can cause damage of the combustor 1a of the gas turbine 1. Therefore, the change rate of the fuel flow rate instruction $f_{DB}^*$ is limited into a predetermined range, and the combustor 1a of the gas turbine 1 is protected.

To realize the above-mentioned operation, the fuel flow rate instruction generating unit 21 is composed of a lower value selector 21a and a change rate limiter 21b. The lower value selector 21a outputs the duct burner fuel flow rate set point $f_{DB}^{in}$ just as it is, when the duct burner fuel flow rate set point $f_{DB}^{in}$ is equal to or lower than the flow rate upper limit $f_{MAX}$. The lower value selector 21a outputs the flow rate upper limit $f_{MAX}$ when the duct burner fuel flow rate set point $f_{DB}^{in}$ is higher than the flow rate upper limit $f_{MAX}$. The change rate limiter 21b generates the fuel flow rate instruction $f_{DB}^*$ in accordance with the output of the lower value selector 21a while limiting the change rate of the fuel flow rate to the predetermined range. By the operations of the lower value selector 21a and change rate limiter 21b, the flue flow rate instruction $f_{DB}^*$ is generated such that the fuel flow rate instruction $f_{DB}^*$ does not exceed the flow rate upper limit $F_{MAX}$ and the change rate of the fuel flow rate instruction $f_{DB}^*$ is limited within the predetermined range.

The open degree determining unit 22 determines the open degree instruction $CSO_{DB}$ for the fuel control valve 10 in response to one selected from the fuel flow rate instruction $f_{DB}^*$ and the manual open degree instruction $CSO_{MAN}$ based on the manual setting signal $S_{MAN}$. When the duct burner controller 13 operates in the automatic mode, that is, the manual setting signal $S_{MAN}$ is in the "low" state, the open degree determining unit 22 determines the open degree instruction $CSO_{DB}$ for the fuel control valve 10 based on the fuel flow rate instruction $f_{DB}^*$. On the other hand, when the duct burner controller 13 operates in the manual mode, that is, the manual setting signal $S_{MAN}$ is in the "high" state, the open degree determining unit 22 determines the open degree instruction $CSO_{DB}$ for the fuel control valve 10 in response to the manual open degree instruction $CSO_{MAN}$.

In detail, the open degree determining unit 22 contains a subtracter 22a, a PI control unit 22b, a selector 22c and a change rate limiter 22d.

The subtracter 22a calculates a difference $\Delta f_{DB}$ by subtracting a measurement value of the flow rate $f_{DB}$ of the fuel supplied to the duct burner 9 from the fuel flow rate instruction $f_{DB}^*$.

The PI control unit 22b determines the open degree instruction $CSO_{PI}$. The operation of the PI control unit 22b is different between the automatic mode and the manual mode. When the duct burner controller 13 operates in the automatic mode, the PI control unit 22b determines the open degree instruction $CSO_{PI}$ by carrying out the PI control (the proportional-plus-integral control) based on the difference $\Delta f_{DB}$. On the other hand, when the duct burner controller 13 operates in the manual mode, the PI control unit 22b receives the open degree $CSO_{DB}$ outputted from the open degree determining unit 22 and outputs the received open degree $CSO_{DB}$ as the open degree instruction $CSO_{PI}$. That is, when the duct burner controller 13 operates in the manual mode, the open degree instruction $CSO_{PI}$ is generated so as to follow the open degree $CSO_{DB}$ for the fuel control valve 10. Because the open degree instruction $CSO_{PI}$ follows the open degree instruction $CSO_{DB}$ when the duct burner controller 13 operates in the manual mode, the open degree instruction $CSO_{PI}$ is prevented from rapid change when the duct burner controller 13 is switched from the manual mode to the automatic mode.

The selector 22c outputs the open degree $CSO_{PI}$ determined by the PI control unit 22b when the manual setting signal $S_{MAN}$ is in the "low" state. The selector 22c outputs the manual open degree instruction $CSO_{MAN}$ when the manual setting signal $S_{MAN}$ is in the "high" state. That is, the selector 22c outputs the open degree instruction $CSO_{PI}$ determined by the PI control when the duct burner controller 13 is in the automatic mode, and outputs the manual open degree instruction $CSO_{MAN}$ when the duct burner controller 13 is in the manual mode.

The change rate limiter 22d generates the open degree instruction $CSO_{DB}$ for the fuel control valve 10 by following the output of the selector 22c while limiting the change rate within the predetermined range. For protecting the combustor 1a of the gas turbine 1, it is important to limit the change rate of the open degree instruction $CSO_{DB}$ for the fuel control valve 10 within the predetermined range. When the open degree of the fuel control valve 10 decreases rapidly, the fuel supplied to the duct burner 9 decreases rapidly and therefore, the generator output LD of the generator 2 decreases rapidly. As previously mentioned, the rapid decrease of the generator output LD causes rapid increase of the fuel supplied to the gas turbine 1. It results in the damage of the combustor 1a of the gas turbine 1. For this reason, the change rate of the open degree of the fuel control valve 10 is limited within the predetermined range so as to protect the combustor 1a of the gas turbine 1.

As for the change rate of the open degree of the fuel control valve 10, it is possible to adopt a control method that the decreasing rate is limited but the increasing rate is not limited. However, from the viewpoint of the improvement of safety of the combustor 1a of the gas turbine 1, it is desirable that both of the decreasing rate and the increasing rate of the open degree of the fuel control valve 10 are limited.

The above-mentioned duct burner controller 13 is realized by a computer program and a CPU, which executes the computer program. In the computer program, a procedure for realizing the operations of the above fuel flow rate instruction generating unit 21 and open degree determining unit 22 is described. Therefore, by the above-mentioned CPU executing the computer program, the operations of the fuel flow rate instruction generating unit 21 and open degree determining unit 22 can be realized.

Figure 3:
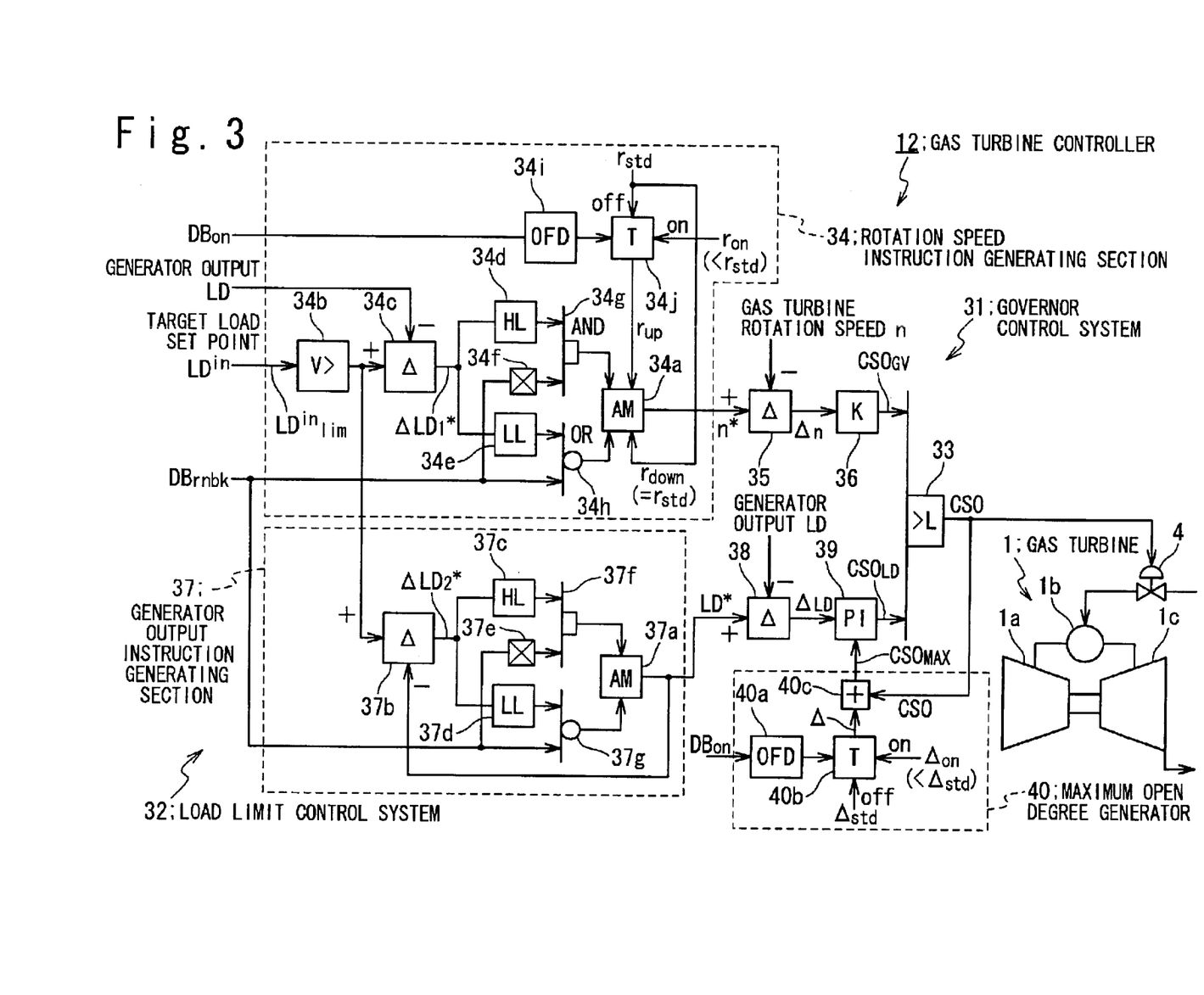
FIG. 3 is a function diagram showing an operation of a gas turbine controller.

FIG. 3 is a function diagram showing an operation of the gas turbine controller 12. The gas turbine controller 12 is composed of a governor control system 31 which carries out a governor control, a load limit control system 32 which carries out load limit control, and a lower value selector 33.

The governor control system 31 generates a governor control open degree instruction $CSO_{GV}$ in response to a rotation speed n of the gas turbine 1 which is measured by a rotation speed meter (not shown). The load limit control system 32 generates a load limit control open degree instruction $CSO_{LD}$ in response to the generator output LD. The lower value selector 33 selects the smaller one of the governor control open degree instruction $CSO_{GV}$ and the load limit control open degree instruction $CSO_{LD}$ as the open degree instruction CSO and supplies the open degree instruction CSO to the fuel control valve 4. The fuel control valve 4 is set to an open degree designated by the open degree instruction CSO.

More specifically, the governor control system 31 is composed of a rotation speed instruction generating section 34, a subtracter 35 and a proportional control unit 36. The rotation speed instruction generating section 34 generates a rotation speed instruction n* based on a target load set point $LD^{in}$ which is set by the operator of the plant, and the generator output LD. The subtracter 35 generates Δn by subtracting the gas turbine rotation speed n from the rotation speed instruction n*. The proportional control unit 36 carries out the proportional control based on the difference Δn and generates the governor control open degree instruction $CSO_{GV}$. The governor control open degree instruction $CSO_{GV}$ is generated through the proportional control carried out by the proportional control unit 36 such that the gas turbine rotation speed n coincides with the rotation speed instruction n*.

The rotation speed instruction generating section 34 changes the rotation speed instruction n* based on the target load set point $LD^{in}$ and the generator output LD. If the target load set point $LD^{in}$ is larger than the generator output LD, the rotation speed instruction generating section 34 increases the rotation speed instruction n*. If the target load set point $LD^{in}$ is smaller than the generator output LD, the rotation speed instruction generating section 34 decreases the rotation speed instruction n*. Under the condition that the target load set point $LD^{in}$ is larger than the generator output LD, the increase rate of the rotation speed instruction n* is determined in accordance with the state of combustion of the duct burner 9, namely, the condition of the fuel supply to the duct burner 9. The increasing rate of the rotation speed instruction n* for the combustion period of the duct burner 9 and for a predetermined period subsequent to a combustion stop period of the duct burner 9 is suppressed to be smaller than the increasing rate of the rotation speed instruction n* for another period as a non-combustion period of the duct burner 9. When the duct burner 9 is in the combustion period, rapid decrease of the fuel supplied to the duct burner 9 can cause rapid decrease of the generator output LD. By rapid decrease of the generator output LD, the rotation speed instruction n* increase rapidly. Thus, rapid increase of the flow rate of fuel supplied to the gas turbine 1 is caused. Therefore, to prevent rapid increase of the flow rate of the fuel supplied to the gas turbine, the increasing rate of the rotation speed instruction n* is set relatively small during the combustion period of the duct burner 9.

The reason why the increasing rate of the rotation speed instruction n* is restrained for the predetermined period subsequent to the combustion stop period of the duct burner 9 is that there is a delay time from when the change of the flow rate of the fuel supplied to the duct burner 9 is caused to when the flow rate of the fuel supplied to the gas turbine 1 changes. Because of the existence of this delay time, the rapid increase of the flow rate of fuel supplied to the gas turbine 1 is caused through the rapid decrease of the flow rate of fuel supplied to the duct burner 9 even for the predetermined period after the combustion stop of the duct burner 9. For this reason, the increasing rate of the rotation speed instruction n* is constrained for the predetermined period after the combustion stop of the duct burner 9.

On the other hand, the problem of rapid decrease of the flow rate of fuel supplied to the duct burner 9 does not occur for a period other than the combustion period of the duct burner 9 and the predetermined period after the combustion stop of the duct burner 9. For this reason, the increasing rate of the rotation speed instruction n* is set relatively large, resulting in improvement of the responsibility of the control of the gas turbine 1.

To realize such an operation, the rotation speed instruction generating section 34 is supplied with a duct burner state notice signal $DB_{ON}$. The duct burner state notice signal $DB_{ON}$ is the signal to inform whether the duct burner 9 is in the combustion state, to the rotation speed instruction generating section 34. The duct burner state notice signal $DB_{ON}$ is set to the "high" state when the duct burner 9 is in the combustion state and is set to the "low" state when the duct burner 9 is not in the combustion state, i.e., is in the non-combustion state or combustion stop state. The rotation speed instruction generating section 34 carries out the above-mentioned operation in response to the duct burner state notice signal $DB_{ON}$.

The rotation speed instruction n* generated by the rotation speed instruction generating section 34 is compulsorily run back to a relatively low set value independently of the generator output LD when the duct burner 9 is urgently stopped due to the abnormal event. That is, the rotation speed instruction n* is decreased to a predetermined value when the duct burner 9 is urgently stopped due to the abnormal event. When the duct burner 9 is urgently stopped, the generator output LD decreases rapidly. At this time, if the rotation speed instruction n* is increased in response to the increase of the generator output LD, the rapid increase of the rotation speed instruction n* would be caused. The combustor 1a of the gas turbine 1 can be kept safe by the compulsive run back of the rotation speed instruction n* to the relatively low predetermined value independently of the generator output LD after the duct burner 9 is stopped urgently. The reason why the run back is carried out when the rotation speed instruction n* is set relatively low is that it possible to prevent rapid decrease of the fuel supplied to the gas turbine 1, and therefore to prevent accidental fire or damage of the combustor 1a of the gas turbine 1.

To realize the compulsive run back, a duct burner fault notice signal $DB_{rnbk}$ is supplied to the rotation speed instruction generating section 34 to notify emergent stop of the duct burner 9. The duct burner fault notice signal $DB_{rnbk}$ is set to the "low" state in the normal state and is set to the "high" state when the duct burner 9 is urgently stopped. The rotation speed instruction generating section 34 carries out the above-mentioned operation in response to the duct burner fault notice signal $DB_{rnbk}$.

Such a function of the rotation speed instruction generating section 34 is realized by an analog memory (AM) 34a, a change rate limiter 34b, a subtracter 34c, a higher limit detector 34d, a lower limit detector 34e, a NOT gate 34f, an AND gate 34g, an OR gate 34h, an off-delay 34i and a selector 34j.

The analog memory 34a stores a rotation speed instruction n*. The stored rotation speed instruction n* is supplied to the subtracter 35 and is used for the governor control. The change rate limiter 34b, the subtracter 34c, the higher limit detector 34d, the lower limit detector 34e, the NOT gate 34f, the AND gate 34g and the OR gate 34h play a role to instruct change of the rotation speed instruction n* to the analog memory 34a.

More specifically, the change rate limiter 34b generates a change rate limited target load set point $LD^{in}{}_{lim}$ following the target load set point $LD^{in}$ while limiting the change rate within a predetermined range. As described later, the rotation speed instruction n* is determined based on the change rate limited target load set point $LD^{in}{}_{lim}$. Rapid change of the rotation speed instruction n* is prevented through the limitation of the change rate of the change rate limited target load set point $Ld^{in}{}_{lim}$, and the combustor 1b of the gas turbine 1 is protected.

The subtracter 34c generates a difference $\Delta LD_1{}^*$ by subtracting the generator output LD from the change rate limited target load set point $LD^{in}{}_{lim}$.

The higher limit detector 34d sets the output to the "high" state if the difference $\Delta LD_1{}^*$ generated by the subtracter 34c is equal to or higher than a set value, that is, if the generator output LD is equal to or smaller than the change rate limited target load set point $LD^{in}{}_{lim}$. The output of the higher limit detector 34d is supplied to one of the input terminals of the AND gate 34g. To the other input terminal of the AND gate 34g, the duct burner fault notice signal $DB_{mbk}$ is supplied via the NOT gate 34f. The output of the AND gate 34g is used as an increase instruction to instruct increase the rotation speed instruction n* to the analog memory 34a. That is, the analog memory 34a is instructed to increase the rotation speed instruction n* when the duct burner 9 is normally operating and the difference $\Delta LD_1{}^*$ is equal to or higher than a predetermined value. When the duct burner fault notice signal $DB_{mbk}$ is in the "high" state, that is, when the duct burner 9 is urgently stopped, the rotation speed instruction n* is compulsively run back. Therefore, the increase instruction is not supplied to the analog memory 34a.

On the other hand, the lower limit detector 34e sets the output to the "high" state when the difference $\Delta LD_1{}^*$ generated by the subtracter 34c is lower than the predetermined value, that is, when the generator output LD is larger than the change rate limited target load set point $LD^{in}{}_{lim}$. The output of the lower limit detector 34e is supplied to one of the input terminals of the OR gate 34h. To the other input terminal of the OR gate 34h, the duct burner fault notice signal $DB_{mbk}$ is supplied. The output of the OR gate 34h is used as a decrease instruction to instruct decrease of the rotation speed instruction n* to the analog memory 34a. That is, the analog memory 34a is instructed to decrease the rotation speed instruction n* when the difference $\Delta LD_1{}^*$ is lower than the predetermined value. Further, when the duct burner fault notice signal $DB_{mbk}$ is in the "high" state, that is, when the duct burner 9 is stopped urgently, the output of the OR gate 34h is set to the "high" state independently of the difference $\Delta LD_1{}^*$. As far as the duct burner fault notice signal $DB_{mbk}$ is in "high" state, the analog memory 34a is instructed to decrease the rotation speed instruction n*. The analog memory 34a gradually decreases the rotation speed instruction n* to the predetermined value of the rotation speed instruction n*.

When the analog memory 34 is decreasing the rotation speed instruction n*, the change rate i.e., the decreasing rate $r_{down}$ of the rotation speed instruction n* is constant to a standard change rate $r_{std}$ regardless of the combustion state of the duct burner 9. The analog memory 34a keeps decreasing the rotation speed instruction n* by the decreasing rate $r_{down}$ per each clock cycle of the gas turbine controller 12 while the decrease instruction of the rotation speed instruction n* is given from the OR gate 34h.

On the other hand, the change rate, i.e., increasing rate $r_{up}$ of the rotation speed instruction n* while the analog memory 34a is increasing the rotation speed instruction n*, is generated by the off-delay 34i and the selector 34j and supplied to the analog memory 34a. The output of the off-delay 34i is set to either of the "low" state or "high" state in response to the duct burner state notice signal $DB_{ON}$. The rising timing of the output of the off-delay 34i from the "low" state to the "high" state is substantially simultaneous with the rising timing of the duct burner state notice signal $DB_{ON}$. On the other hand, the falling timing of the output of the off-delay 34i from the "high" state to the "low" state is delayed by a predetermined time from the falling timing of the duct burner state notice signal $DB_{ON}$. Thus, the output of the off-delay 34i keeps the "high" state for the combustion period of the duct burner 9 and a predetermined period subsequent to the combustion period. In the other period, the output of the off-delay 34i keeps the "low" state. The selector 34j outputs the standard change rate $r_{std}$ when the output of the off-delay 34i is "low" state. The selector 34j outputs $r_{on}$ which is smaller than the standard change rate $r_{std}$ when the output of the off-delay 34i is in the "high" state. The output of the selector 34j is used as the increase rate $r_{up}$, which is used to increase the rotation speed instruction n*. The analog memory 34a keeps increasing the rotation speed instruction n* by $r_{up}$ per each clock cycle of the gas turbine controller 12 while the increase instruction of the rotation speed instruction n* is given from the AND gate 34g.

Through such operations carried out by the off-delay 34i and the selector 34j, the increase rate $r_{up}$ for the rotation speed instruction n* is set to the relatively small value $r_{on}$ for the combustion period of the duct burner 9 and the predetermined period subsequent to the combustion period. For the other period, the increase rate $r_{up}$ is set to the relatively large value $r_{std}$. Thus, rapid increase of the flow rate of fuel supplied to the gas turbine 1 caused due to rapid decrease of the flow rate of fuel supplied to the duct burner 9 can be prevented, and therefore the combustor 1b of the gas turbine 1 is kept safe.

On the other hand, the load limit control system 32 is composed of a generator instruction generating section 37 which generates generator output instruction LD*, a subtracter 38 and a PI control unit 39. The generator instruction generating section 37 generates a generator output instruction LD*. The subtracter 38 generates difference $\Delta LD$ by subtracting the generator output LD from the generator output instruction LD*. The proportional control unit 39 carries out the PI control (the proportional-plus-integral control) based on the difference $\Delta LD$ and generates the load limit control open degree instruction $CSO_{LD}$. The load limit control open degree instruction $CSO_{LD}$ is generated through the PI control carried out by the PI control unit 39 such that the generator output LD is controlled to be coincident with the generator output instruction LD*. It should be noted that the load limit control open degree instruction $CSO_{LD}$ generated by the PI control unit 39 is limited lower than a permitted maximum value $CSO_{MAX}$ which is determined by a maximum open degree determining unit 40. If the load limit control open degree instruction $CSO_{LD}$ calculated by the PI control exceeds the permitted maximum value $CSO_{MAX}$, the load limit control open degree instruction $CSO_{LD}$ is set to the permitted maximum value $CSO_{MAX}$.

The generator output instruction generating section 37 changes the generator output instruction LD* in response to the difference between the change rate limited target load set point $LD^{in}{}_{lim}$ outputted from the change rate limiter 34b of the rotation speed instruction generating section 34 and the generator output instruction LD*. When the generator output instruction LD* becomes smaller than the target load set point $LD^{in}{}_{lim}$, the generator output instruction LD* is increased. When the generator output instruction LD* becomes larger than the target load set point $LD^{in}{}_{lim}$, the generator output instruction LD* is decreased.

In the case that the duct burner 9 is urgently stopped in an abnormal event, the generator output instruction LD* generated by the generator output instruction generating section 37 is compulsorily run back to a relatively low predetermined value. When the duct burner 9 is urgently stopped, the generator output LD decreases rapidly. At this time, if the generator output instruction LD* is remained just it is, the difference ΔLD between the generator output instruction LD* and the generator output LD increases and causes rapid increase of the load limit control open degree instruction $CSO_{LD}$. The rapid increase of the load limit control open degree instruction $CSO_{LD}$ causes rapid increase of the flow rate of fuel supplied to the gas turbine 1 and causes burnout of the combustor 1a of the gas turbine 1. By the compulsive run back of the generator output instruction LD* to the relatively low value, the combustor 1a of the gas turbine 1 is kept safe even when the duct burner 9 is stopped urgently. To carry out such an operation, the duct burner fault notice signal $DB_{rnbk}$ is supplied to the generator output instruction generating section 37 to notify the urgent stop of the duct burner 9. The reason why the run back carried out while the generator output instruction LD* is set to a relatively low set value is that it possible to prevent rapid decrease of the flow rate of fuel supplied to the gas turbine 1, and therefore the combustor 1a of the gas turbine 1 is protected from accidental fire or damage.

Such a function of the generator output instruction generating section 37 is realized by an analog memory (AM) 37a, a subtracter 37b, a higher limit detector 37c, a lower limit detector 37d, a NOT gate 37e, an AND gate 37f and an OR gate 37g.

The analog memory 37a stores the generator output instruction LD*. The stored generator output instruction LD* is supplied to the subtracter 38 and is used for the load limit control.

The subtracter 37b generates the difference $\Delta LD_2^*$ by subtracting the generator output instruction LD* from the change rate limited target load set point $LD^{in}{}_{lim}$.

The higher limit detector 37c sets the output to the "high" state when the difference $\Delta LD_2^*$ is equal to or higher than a predetermined value, that is, when the generator output instruction LD* is smaller than the change rate limited target load set point $LD^{in}{}_{lim}$. The output of the higher limit detector 37c is supplied to one of the input terminals of the AND gate 37f. To the other input terminal of the AND gate 37f, the duct burner fault notice signal $DB_{rnbk}$ is supplied via the NOT gate 37e. The output of the AND gate 37f is used as the increase instruction to instruct the analog memory 37a to increase the generator output instruction LD*. That is, the analog memory 37a is instructed to increase the generator output instruction LD* when the duct burner 9 is normally operating and the difference $\Delta LD_2^*$ is equal to or higher than the predetermined value. When the duct burner fault notice signal $DB_{rnbk}$ is in the "high" state, that is, when the duct burner 9 is urgently stopped, the generator output instruction LD* is compulsively run back. Therefore, the instruction to increase the generator output is not supplied to the analog memory 34a.

On the other hand, the lower limit detector 37d sets the output to the "high" state when the difference $\Delta LD_2^*$ is smaller than the predetermined value, that is, when the generator output instruction LD* is larger than the change rate limited target load set point $LD^{in}{}_{lim}$. The output of the lower limit detector 37d is supplied to one of the input terminals of the OR gate 37g. To the other input terminal of the OR gate 37g, the duct burner fault notice signal $DB_{rnbk}$ is supplied. The output of the OR gate 37g is used as the decrease instruction to instruct the analog memory 37a to decrease the generator output instruction LD*. That is, the analog memory 37a is instructed to decrease the generator output instruction LD* when the difference $\Delta LD_2^*$ is smaller than the predetermined value. Further, when the duct burner fault notice signal $DB_{rnbk}$ is in the "high" state, that is, when the duct burner 9 is stopped urgently, the output of the OR gate is set to the "high" state independently of the difference $\Delta LD_2^*$. At this time, the analog memory 37a is instructed to decrease the generator output instruction LD* as far as the duct burner fault notice signal $DB_{rnbk}$ is in the "high" state. The analog memory 37d gradually decreases the generator output instruction LD* to the predetermined value.

In this way, through the operations carried out by the higher limit detector 37c, the lower limit detector 37d, the NOT gate 37e, the AND gate 37f and the OR gate 37g, the generator output instruction LD* is compulsively run back when the duct burner is urgently stopped in the abnormal event.

A maximum open degree determining unit 40 generates a permitted maximum value $CSO_{max}$ by adding the permitted open degree increase value Δ to the open degree instruction CSO given to the fuel control valve 4. That is, the load limit control open degree instruction $CSO_{LD}$ does not become larger than the summation of the open degree instruction CSO which is actually given to the fuel control valve 4 and the permitted open degree increase value Δ, so that rapid increase of the load limit control open degree instruction $CSO_{LD}$ is prevented.

The permitted open degree increase value Δ is set relatively low for the combustion period of the duct burner 9 and the predetermined period subsequent to the combustion period. For the other period, the permitted open degree increase value Δ is set relatively high. Thus, rapid increase of the flow rate of fuel supplied to the gas turbine 1 caused due to rapid decrease of the flow rate of fuel supplied to the duct burner 9 is prevented.

To realize the above-mentioned operation, the maximum open degree determining unit 40 is composed of an off-delay 40a, a selector 40b and an adder 40c. The operation of the off-delay 40a is same as the off-delay 34i of the rotation speed instruction generating section 34. The output of the off-delay 40a is in the "high" state for the combustion period of the duct burner 9 and the predetermined period subsequent to the combustion period. For the other period, the output of the off-delay 40a is in the "low" state. The selector 40b outputs a permitted standard open degree increase value $\Delta_{std}$ when the output of the off-delay 40 is in the "low" state. The selector 40b outputs a value $\Delta_{on}$ smaller than the permitted standard open degree increase value $\Delta_{std}$ when the output of the off-delay is in the "high" state. The adder 40c receives the open degree instruction CSO given to the fuel control valve 4 and generates the permitted maximum value $CSO_{max}$ by adding the open degree instruction CSO and the output of the selector 40b. The permitted maximum value $CSO_{MAX}$ is $CSO + \Delta_{on}$ for the combustion period of the duct burner 9 and the predetermined period subsequent to the combustion period. For the other period, the permitted maximum value $CSO_{max}$ is $CSO + \Delta_{std}$. Because the value $\Delta_{on}$ is smaller than the value $\Delta_{std}$, the permitted maximum value $CSO_{max}$ given to the PI control unit 39 becomes relatively small for the combustion period of the duct burner 9 and the predetermined period subsequent to the combustion period. As the permitted maximum value $CSO_{max}$ is determined in this way, rapid increase of the load limit control open degree instruction $CSO_{LD}$ is prevented.

The above-mentioned gas turbine controller 12 is actually realized by a computer program and a CPU which executes the computer program. In the computer program, a procedure for realizing the operations of the above governor control system 31 and load limit control system 32 is described. Therefore, by the above-mentioned CPU executing the computer program, the operations of the governor control system 31 and load limit control system 32 are realized.

As described above, according to the 1-axis type combined cycle plant of this embodiment, as shown in FIG. 2, the open degree instruction $CSO_{DB}$ of the fuel control valve 10 is determined to prevent rapid decrease of the flow rate of fuel supplied to the duct burner 9. Thus, the safety of the combustor 1b of the gas turbine 1 is secured. That is, the change rate of the open degree instruction $CSO_{DB}$ of the fuel control valve 10 is limited by the change rate limiter 22d. Moreover, the change rate of the fuel flow rate instruction $f_{DB}*$ is limited by the change rate limiter 21b. By virtue of the change rate limitation of the open degree instruction $CSO_{DB}$ of the fuel control valve 10 and the fuel flow rate instruction $f_{DB}*$, rapid decrease of the flow rate of fuel supplied to the duct burner 9 is prevented and rapid increase of the flow rate of fuel supplied to the gas turbine 1 is prevented. As a result, the combustor 1b of the gas turbine 1 is protected.

Moreover, according to the 1-axis type combined cycle plant of this embodiment, as shown in FIG. 3, the permitted maximum increase rate of the open degree instruction CSO of the fuel control valve 4 is set smaller for the combustion period of the duct burner 9 and the predetermined period subsequent to the combustion period than the permitted maximum increase rate of the open degree instruction CSO of the fuel control valve 4 for the period other than the combustion period and the predetermined period subsequent to the combustion period. By this, rapid increase of the flow rate of fuel supplied to the gas turbine 1 caused due to rapid decrease of the flow rate of fuel supplied to the duct burner 9 is prevented so as to protect the combustor 1b of the gas turbine 1. That is, as shown in FIG. 3, for the governor control system 31 of the gas turbine controller 12, the increase rate $r_{up}$ of the rotation speed instruction n* is set smaller for the combustion period of the duct burner 9 and the predetermined period subsequent to the combustion period than the other period, by the operation of the off-delay 34i and the selector 34j. By this, rapid increase of the governor control open degree instruction $CSO_{GV}$ is prevented.

Moreover, for the load limit control system 32, rapid increase of the load limit control open degree instruction $CSO_{LD}$ is prevented through the operation of the maximum open degree generator 40 for the combustion period of the duct burner and the predetermined period subsequent to the combustion period. The maximum open degree generator 40 calculates the permitted maximum value $CSO_{MAX}$ by adding the permitted open degree increase instruction CSO to the open degree instruction CSO of the fuel control valve 4. The permitted open degree increase value Δ is set relatively small for the combustion period of the duct burner 9 and the predetermined period subsequent to the combustion period. For the other period, the permitted open degree increase value Δ is set relatively large. By this, the permitted maximum increase rate of the load limit control open degree instruction is suppressed to relatively small so that rapid increase of the load limit control open degree instruction $CSO_{LD}$ is prevented for the combustion period of the duct burner 9 and the predetermined period subsequent to the combustion period.

The rapid increase of the governor control open degree instruction $CSO_{GV}$ and of the load limit control open degree instruction $CSO_{LD}$ is prevented. Therefore, the permitted maximum increase rate of the open degree instruction CSO for the combustion period of the duct burner 9 and the predetermined period subsequent to the combustion period is suppressed to relatively low level, so that the rapid increase of the flow rate of fuel supplied to the gas turbine 9 caused due to the rapid decrease of the fuel supplied to the duct burner 9 is prevented.

Moreover, according to the 1-axis type combined cycle plant of this embodiment, the rotation speed instruction n* and the generator output instruction LD* are run back to relatively low values when the duct burner 9 is urgently stopped because of an abnormal event. By this, the rapid increase of the flow rate of fuel supplied to the gas turbine 9 can be prevented when the duct burner 9 is stopped urgently.

According to the present invention, the 1-axis type combined cycle plant is supplied which can avoid damage of the combustor of the gas turbine caused due to the rapid increase of the flow rate of fuel supplied to the duct burner.

What is claimed is:

1. A combined cycle plant comprising:
    a gas turbine fuel control valve which controls supply of first fuel;
    a duct burner fuel control valve which controls supply of second fuel;
    a generator;
    a gas turbine which drives said generator by burning said first fuel supplied through said gas turbine fuel control valve;
    a boiler which has a duct burner, heats gas exhausted from said gas turbine by burning said second fuel supplied through said duct burner fuel control valve by said duct burner, and heats water with said heated exhausted gas to generate steam;
    a steam turbine which is driven with said steam to drive said generator; and
    a controller which controls said gas turbine fuel control valve and said duct burner fuel control valve, wherein said controller controls an open degree of said gas turbine fuel control valve such that rapid increase of the supply of said first fuel is restrained when the supply of said second fuel to said duct burner is stopped.

2. The combined cycle plant according to claim 1, wherein said controller comprises:
    a gas turbine controller which controls the open degree of said gas turbine fuel control valve in response to power generated by said generator; and
    a duct burner controller which controls an open degree of said duct burner fuel control valve such that a flow rate of said second fuel supplied to said duct burner is coincident with a duct burner fuel flow rate instruction.

3. The combined cycle plant according to claim 2, wherein said duct burner controller controls the open degree of said duct burner fuel control valve such that a change rate of the open degree of said duct burner fuel control valve falls within a predetermined range.

4. The combined cycle plant according to claim 3, wherein said duct burner controller comprises:
    a fuel flow instruction generating unit which generates said duct burner fuel flow rate instruction as an instruction value of the flow rate of said second fuel supplied to said duct burner, said fuel flow instruction generating unit comprises:

a change rate limitation unit which limits said change rate of said duct burner fuel flow rate instruction within said predetermined range.

5. The combined cycle plant according to claim 2, wherein said gas turbine controller controls the open degree of said gas turbine fuel control valve such that a permitted maximum increase rate of the open degree of said gas turbine fuel control valve for a first period containing a combustion period of said duct burner is smaller than said permitted maximum increase rate of the open degree of said gas turbine fuel control valve for a second period containing a non-combustion period of said duct burner.

6. The combined cycle plant according to claim 2, wherein said gas turbine controller controls the open degree of said gas turbine fuel control valve such that a permitted maximum increase rate of the open degree of said gas turbine fuel control valve for a first period containing a combustion period of said duct burner and a predetermined period subsequent to said combustion period is smaller than said permitted maximum increase rate of the open degree of said gas turbine fuel control valve for a second period containing a non-combustion period of said duct burner.

7. The combined cycle plant according to claim 2, wherein said gas turbine controller comprises:

a rotation speed set point generating unit which generates a gas turbine rotation speed set point;

a governor control unit which determines a governor control open degree instruction such that a rotation speed of said gas turbine is controlled to be coincident with said gas turbine rotation speed set point;

an output set point generating unit which generates a generator output set point;

a load limit control unit which determines a load limit control open degree instruction value such that an output of said generator is controlled to be coincident with said generator output set point; and a gas turbine fuel control valve open degree determining unit which determines an instruction value of the open degree of said gas turbine fuel control valve in response to said governor control open degree instruction and said load limit control open degree instruction, wherein said rotation speed set point generating unit sets said gas turbine rotation speed set point to a first predetermined value when the supply of said second fuel to said duct burner is stopped due to an abnormal event, and said output set point generating unit sets said generator output set point to a second predetermined value when the supply of said second fuel to said duct burner is stopped due to said abnormal event.

8. The combined cycle plant according to claim 7, wherein said rotation speed set point generating unit sets said gas turbine rotation speed set point to said first predetermined value by gradually decreasing said gas turbine rotation speed set point to said first predetermined point when the supply of said second fuel to said duct burner is stopped due to said abnormal event.

9. The 1-axis type combined cycle plant according to claim 7, wherein said output set point generating unit sets said generator output set point to said second predetermined value by gradually decreasing said generator output set point to said second predetermined value when the supply of said second fuel to said duct burner is stopped due to said abnormal event.

10. The combined cycle plant according to claim 1, wherein a turbine axis of said gas turbine, a turbine axis of said steam turbine and a rotor of said generator are coaxially connected and rotate together.

11. A 1-axis type combined cycle plant comprising:

a gas turbine;

a boiler which heats exhausted gas discharged from said gas turbine by a duct burner and heats water with said heated exhausted gas to generate steam;

a steam turbine which is driven with said steam;

a generator;

a gas turbine fuel control valve which supplies fuel to said gas turbine;

a duct burner fuel control valve which supplies fuel to said duct burner;

a gas turbine controller which controls an open degree of said gas turbine fuel control valve in response to power generated by said generator; and a duct burner controller which controls an open degree of said duct burner fuel control valve, wherein a turbine axis of said gas turbine, a turbine axis of said steam turbine and a rotor of said generator are coaxially connected and rotate together, and said duct burner controller includes a duct burner fuel control valve open degree control unit which controls the open degree of said duct burner fuel control valve such that a decrease rate of the open degree of said duct burner fuel control valve falls within a predetermined range.

12. The 1-axis type combined cycle plant according to claim 11, wherein said duct burner controller comprises:

a fuel flow instruction generating unit which generates a fuel flow instruction as an instruction value of the flow rate of fuel supplied to said duct burner, said fuel flow instruction generating unit comprises:

a change rate limitation unit which limits a change rate of said fuel flow instruction within said predetermined range, and said duct burner fuel control valve open degree control unit controls the open degree of said duct burner fuel control valve such that the flow rate of fuel supplied to said duct burner is coincident with said fuel flow instruction.

13. The 1-axis type combined cycle plant according to claim 11, wherein said gas turbine controller controls the open degree of said gas turbine fuel control valve such that a permitted maximum increase rate of the open degree of said gas turbine fuel control valve for a combustion period of said duct burner is smaller than said permitted maximum increase rate of the open degree of said gas turbine fuel control valve for a non-combustion period of said duct burner.

14. The 1-axis type combined cycle plant according to claim 11, wherein said gas turbine controller controls the open degree of said gas turbine fuel control valve such that a permitted maximum increase rate of the open degree of said gas turbine fuel control valve for a combustion period of said duct burner and for a predetermined period subsequent to said combustion period is smaller than said permitted maximum increase rate of the open degree of said gas turbine fuel control valve for a period other than said combustion period and said predetermined period.

15. The 1-axis type combined cycle plant according to claim 11, wherein said gas turbine controller comprises:

a rotation speed set point generating unit which generates a gas turbine rotation speed set point;

a governor control unit which determines a governor control open degree instruction such that rotation speed of said gas turbine is controlled to be coincident with said gas turbine rotation speed set point;

an output set point generating unit which generates a generator output set point;

a load limit control unit which determines a load limit control open degree instruction value such that an output of said generator is controlled to be coincident with said generator output set point; and a gas turbine fuel control valve open degree determining unit which determines an instruction value of the open degree of said gas turbine fuel control valve in response to said governor control open degree instruction and said load limit control open degree instruction, wherein said rotation speed set point generating unit sets said gas turbine rotation speed set point to a first predetermined value when supply of fuel to said duct burner is stopped in an abnormal event, and said output set point generating unit sets said generator output set point to a second predetermined value when the supply of fuel to said duct burner is stopped due to said abnormal event.

16. The 1-axis type combined cycle plant according to claim 15, wherein said rotation speed set point generating unit sets said gas turbine rotation speed set point to said first predetermined value by gradually decreasing said gas turbine rotation speed set point to said first predetermined point when the fuel supply to said duct burner is stopped due to said abnormal event.

17. The 1-axis type combined cycle plant according to claim 15, wherein said output set point generating unit sets said generator output set point to said second predetermined value by gradually decreasing said generator output set point to said second predetermined value when the fuel supply to said duct burner is stopped due to said abnormal event.

18. A 1-axis type combined cycle plant comprising:

a gas turbine;

a boiler which heats exhausted gas discharged from said gas turbine by a duct burner, and heats water with said heated exhausted gas and generates steam;

a steam turbine which is driven by said steam;

a generator;

a gas turbine fuel control valve which supplies said gas turbine with fuel;

a duct burner fuel control valve which supplies said duct burner with fuel;

a gas turbine controller which controls an open degree of said gas turbine fuel control valve in response to an output of said generator; and a duct burner controller which controls an open degree of said duct burner fuel control valve, wherein a turbine axis of said gas turbine, a turbine axis of said steam turbine and a rotor of said generator are coaxially connected and rotate together, and said gas turbine controller controls the open degree of said gas turbine fuel control valve such that a permitted maximum increase rate of the open degree of said gas turbine fuel control valve for a combustion period of said duct burner is smaller than said permitted maximum increase rate of the open degree of said gas turbine fuel control valve for a non-combustion period of said duct burner.

19. A 1-axis type combined cycle plant comprising:

a gas turbine;

a boiler which heats exhausted gas discharged from said gas turbine by a duct burner, and heats water with said heated exhausted gas and generates steam;

a steam turbine which is driven by said steam;

a generator a gas turbine fuel control valve which supplies fuel to said gas turbine;

a duct burner fuel control valve which supplies fuel to said duct burner;

a gas turbine control system which controls an open degree of said gas turbine fuel control valve in response to said generator output; and a duct burner controller which controls the open degree of said duct burner fuel control valve, wherein a turbine axis of said gas turbine, a turbine axis of said steam turbine and a rotor of said generator are coaxially connected and rotate together, and said gas turbine controller controls the open degree of said gas turbine fuel control valve such that a permitted maximum increase rate of the open degree of said gas turbine fuel control valve for a combustion period of said duct burner and for a predetermined period subsequent to said combustion period is smaller than said permitted maximum increase rate of the open degree of said gas turbine fuel control valve for a period other than said combustion period and said predetermined period.

20. A 1-axis type combined cycle plant comprising:

a gas turbine;

a boiler which heats exhausted gas discharged from said gas turbine by a duct burner, and heats water with said heated exhausted gas and generates steam;

a steam turbine which is driven by said steam;

a generator;

a gas turbine fuel control valve which supplies fuel to said gas turbine;

a duct burner fuel control valve which supplies fuel to said duct burner;

a gas turbine controller which controls an open degree of said gas turbine fuel control valve in response to an output of said generator; and a duct burner controller which controls the open degree of said duct burner fuel control valve, wherein a turbine axis of said gas turbine, a turbine axis of said steam turbine and a rotor of said generator are coaxially connected and rotate together, and said gas turbine controller comprises:

a rotation speed set point generating unit which generates a gas turbine rotation speed set point;

a governor control unit which determines a governor control open degree instruction such that a rotation speed of said gas turbine is controlled to be coincident with said gas turbine rotation speed set point;

an output set point generating unit which generates a generator output set point;

a load limit control unit which determines a load limit control open degree instruction value such that the output of said generator is controlled to be coincident with said generator output set point; and a gas turbine fuel control valve open degree determining unit which determines an instruction value of the open degree of said gas turbine fuel control valve in response to said governor control open degree instruction and said load limit control open degree instruction, and said rotation speed set point generating unit sets said gas turbine rotation speed set point to a first predetermined value when the fuel supply of said duct burner is stopped in an abnormal event, and said output set point generating unit sets said generator output set point to a second predetermined value when the fuel supply of said duct burner is stopped by said abnormal event.

* * * * *